United States Patent
Reding et al.

[11] Patent Number: 5,822,414
[45] Date of Patent: Oct. 13, 1998

[54] METHOD AND APPARATUS FOR AUTOMATING TELECOMMUNICATIONS CLASS CHARGING AND FOR REDUCING OPERATOR ERRORS

[75] Inventors: Craig Reding, Midland Park, N.J.; Suzi Levas, Yorktown, N.Y.

[73] Assignee: Nynex Science & Technology, Inc., White Plains, N.Y.

[21] Appl. No.: 712,439

[22] Filed: Sep. 5, 1996

[51] Int. Cl.$^6$ .................................................. H04M 15/00
[52] U.S. Cl. ...................... 379/114; 379/112; 379/115; 379/120; 379/223; 379/260; 379/267
[58] Field of Search ........................ 379/111–115, 127, 379/133, 223, 227, 260, 265, 267, 117, 118, 120, 121, 126, 134, 136, 242, 243, 262, 269

[56] References Cited

U.S. PATENT DOCUMENTS

| | | | |
|---|---|---|---|
| 4,726,056 | 2/1988 | An et al. | 379/114 |
| 5,210,789 | 5/1993 | Jeffus et al. | 379/127 |

*Primary Examiner*—Paul Loomis
*Assistant Examiner*—Binh K. Tieu
*Attorney, Agent, or Firm*—Michaelson & Wallace; Peter L. Michaelson; Michael P. Straub

[57] ABSTRACT

Methods and apparatus for automating telecommunications billing operations and reducing operator errors when processing operator assisted telephone calls is disclosed. In accordance with the invention, when an operator assisted telephone call is being serviced, a computer is used to automatically generate default billing charge information, e.g., a default class charge, which is automatically entered unless the operator alters this computer generated information. In addition, the computer provides the operator with messages regarding restrictions which are applicable to the call being processed as well as other useful call processing information. When the operator alters the default class charge, a check is automatically performed to insure that the new class charge is a valid class charge. If the class charge appears to be in error, a message is provided to the operator and the operator is given a chance to alter the class charge information before the call is terminated. In this manner, the present invention insures if the operator fails to enter a class charge, the operator assisted call will be billed at the most frequently billed rate for the particular type of call being serviced. The messages provided to the operator also reduce the risk of the operator performing an unauthorized telephone transaction.

14 Claims, 4 Drawing Sheets

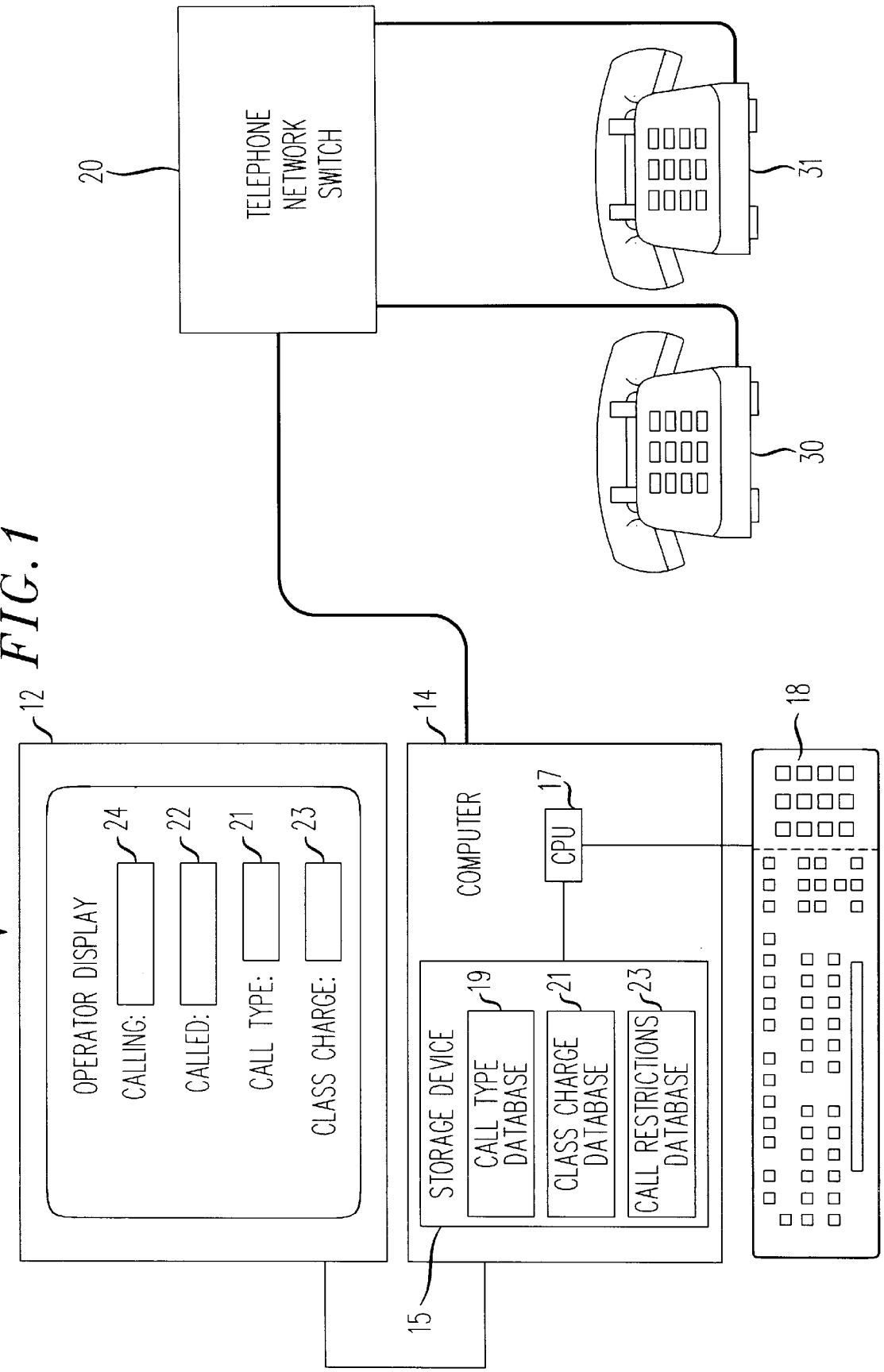

METHOD AND APPARATUS FOR AUTOMATING TELECOMMUNICATIONS CLASS CHARGING AND FOR REDUCING OPERATOR ERRORS

FIELD OF THE INVENTION

The present invention relates to telephone systems and, more particularly, to methods and apparatus for automating telecommunications billing operations and reducing operator errors.

BACKGROUND OF THE INVENTION

Computers have facilitated the automated billing of non-operator assisted telephone calls. This has eliminated the need for an operator to provide direct computer input, e.g. call class charge information, for the billing of such calls. Accordingly, most telephone call billing operations are now automatically performed by telephone switches or computers coupled thereto.

Telephone communication services are generally billed at different rates depending on the service provided and the source of the call. The billing rate is determined as a function of what is referred to as a class charge. The class charge is usually a function of the type of call, i.e., call type. A call type is an identifier used to distinguish between a variety of different call categories, e.g., pay phone ("coin") calls, calls from private residences, calls from hotels, emergency service calls such as 911, etc. For some call types a single fixed class charge is applicable. However, for other call types a plurality of class charges may be applicable.

Unfortunately, because the precise service provided by an operator during an operator assisted telephone call often determines the appropriate class charge for a given call type or may even alter the call type altogether, it is far more difficult to automate the billing of operator assisted telephone calls then calls which do not involve operator intervention.

Because of the problems associated with automating billing procedures relating to operator assisted telephone calls, operators are presently required to manually enter, e.g., via a computer keyboard, telephone class charge information for each operator assisted telephone call that they service.

When operators fail to enter the class charge required for billing purposes, the telephone call may be completed but will go unbilled. This results in an undesirable loss in revenue to the telephone company servicing the call. In addition to failing to enter the call type required for billing, a host of other operator errors may occur, e.g., erroneous class charge information may be entered. The entry of erroneous information can result in calls being under or over billed. Under billed calls represent a loss of revenue to the telephone company while over billed calls represent errors which may be disputed and result in customer relations problems as well as additional expenses associated with correcting customers' bills.

In addition to making errors with regard to the input of billing information, telephone operators may make a host of other undesirable mistakes when servicing a call. For example, call restrictions may be placed on calls from some locations, e.g., particular destination numbers such as 900 numbers may be blocked. Other types of restrictions may also exist, e.g., for calls made from prison phones. In an attempt to avoid the automated call restrictions that are implemented, a caller may make an operator assisted call and attempt to have the operator transfer or complete the call to what would otherwise be an automatically blocked telephone number.

One example of such a situation is where a prisoner initiates an unrestricted and unmonitored call to his attorney. Assuming the attorney is out of the office and does not answer, the prisoner's call may be transferred to the operator by a secretary at the prisoner's request. At this point the prisoner will sometimes ask to be transferred to a different telephone number in an attempt to complete an unrestricted and unmonitored telephone call to a restricted telephone number. Due to operator errors, and the operator's inability to remember all the restrictions on various types of calls, the operator will sometimes complete the call to an otherwise blocked or restricted destination telephone number.

Accordingly, there is a need for reducing the chances of an operator erroneously assisting in the completion of calls to what should be blocked or restricted destination telephone numbers as well as for reducing operator errors associated with the billing of, e.g., operator assisted telephone calls.

SUMMARY OF THE PRESENT INVENTION

The present invention relates to telephone systems and, more particularly, to methods and apparatus for automatic telecommunications billing operations and reducing operator errors.

In accordance with one embodiment of the present invention, a telephone operator's workstation includes a display device, a central processing unit and an input device, e.g., keypad. The workstation is coupled to one or more telephone switches. When a customer coupled to the switch seeks to make an operator assisted call, the call is routed via the switch to a telephone operator's workstation. The switch provides the workstation with originating switch identifier information, call type information and call restriction information. The call type information may be switch dependent, e.g., different types of switches may use different call type identifiers.

Using the originating switch information and the call type information provided by the switch to the operator workstation, the workstation makes a call type determination by performing a lookup operation on a database. The database used in the look-up operation includes originating switch and call type information correlated to call types used by the phone company servicing the call. The call type information thus obtained is then automatically displayed on the screen of the workstation along with other information, e.g., the caller's telephone number, a called telephone number field and a class charge field.

In order to eliminate the possibility of the class charge field being left blank and the call going unbilled, a lookup operation is automatically performed by the workstation to determine the most frequently used billing charge, e.g., class charge, for the particular call type. The automatically generated class charge serves as a default class charge. The default class charge is entered into the class charge field and displayed on the screen for the operator's review. In servicing the call, it is the operator's responsibility to review and override the automatically determined default class charge in the event that a different class charge is appropriate for the service provided. If no override is entered, the default class charge is used to bill the call.

In the above described manner, a significant portion of work associated with entering class charge information for an operator assisted call is automated and the possibility of calls being serviced without class charge information being entered is eliminated.

In addition to obtaining billing information based on call type, the workstation of the present invention uses call restriction and/or call type information obtained from the switch to access a call restriction or warning message database. The warning message database includes a plurality of messages warning operators of restrictions or blocked numbers relating to certain types of calls. These messages are automatically accessed by the workstation and displayed to put the operator on notice that for a particular caller or type of call certain services which are usually available to most customers, e.g., call transfers or connections to certain destination telephone numbers, are impermissible.

By thus automating the call billing process to a far greater extent than previously done in the context of operator assisted telephone calls, by performing a number of error checks and by warning operators against providing certain services to particular callers, billing accuracy is increased and the number of unauthorized call transactions completed by operators is reduced.

The automation of particular aspects of billing an operator assisted telephone call has the additional advantage of reducing the amount of time required for an operator to service such a telephone call.

BRIEF DESCRIPTION OF THE DRAWINGS

FIG. 1 is a diagram of an operator workstation, suitable for implementing the method of the present invention, coupled to a telephone network.

DETAILED DESCRIPTION

Figure 2A:
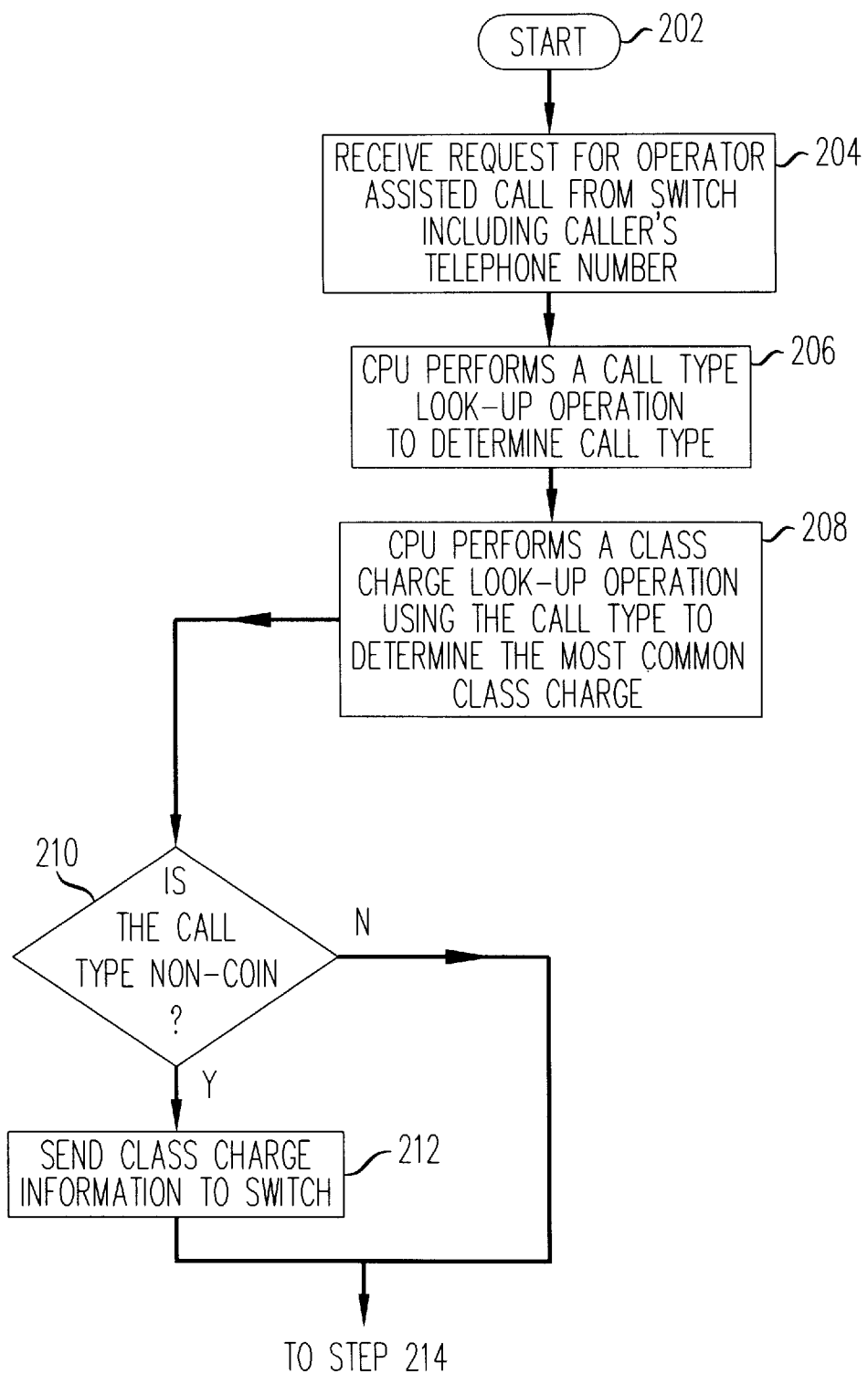
FIG. 2, which comprises the combination of FIGS. 2A, 2B and 2C, is a flow chart illustrating the method of the present invention which may be implemented in software.

The present invention relates to telephone systems and, more particularly, to methods and apparatus for automating telecommunications billing operations and reducing operator errors.

As discussed above, in accordance with the present invention, when an operator assisted telephone call is being serviced, a computer 14 is used to generate the most frequently or commonly used billing charge information, e.g., class charge information, which is automatically entered as the default class charge unless the operator alters this computer generated information. In addition, the computer 14 provides the operator with messages regarding restrictions which are applicable to the call being processed as well as other useful call processing information. When the operator alters the class charge information, a check is automatically performed to insure that it is a valid class charge. If the class charge appears to be in error a message is provided to the operator giving the operator a chance to alter the class charge information before it is sent to the switch and the call is terminated.

The apparatus used to implement the present invention will now be described with reference to FIG. 1. FIG. 1 illustrates an operator workstation 10 suitable for implementing the present invention coupled to a telephone switch 20. The telephone switch 20 which may be part of a telephone network couples the operator workstation 10 to a plurality of telephones 30, 31 from which customers may initiate telephone calls including operator assisted telephone calls. The workstation 10 may be used by, e.g., a telephone operator, to service operator assisted telephone calls.

As illustrated in FIG. 1, the operator workstation 10 includes a display device 12, a computer 14, a standard computer keyboard 16 which includes a numeric or telephone keypad 18. The computer 14 includes a data storage device 15 and a central processing unit 17. The data storage device 15, which may be the computer's memory, is used to store a wide range of information including a call type database 19, a class charge database 21, and a call restrictions database 23. The call type database includes information correlating telephone originating switch information and call type identifier information provided by an originating switch 20 to call types used for billing purposes, e.g., pay phone ("coin drop" or "coin") calls, hotel calls, school calls, residence calls, etc. The call type is generally based on the type of phone and location from which a call is placed. The class charge database 21 includes information on possible class charges.

Multiple class charges may be applicable for a given call type, e.g., depending on the type of assistance provided by the operator. The call restrictions database 23 includes information on calling restrictions, warning messages and other information useful to an operator that is applicable to the different possible call types that may be encountered. The call restrictions database 23 is accessed using call restriction information provided by the switch 20 at the beginning of an operator assisted telephone call.

A central processing unit 17 receives and sends data to and from the telephone network switch 20. It also controls the display of information on the display device 12. The keyboard 16 can be used for inputting alphabetic as well as numeric information. The numeric or telephone keypad 18 included in the keyboard 20 is used primarily for inputting numeric data representing, e.g., telephone numbers.

The display device 12 is used to display a plurality of data fields, e.g., a calling field 24, a called field 22, a call type field 21 and a class charge field 23. The destination telephone number can be displayed in the called data field 22 as a series of numeric and/or alphabetic characters. The display device 12 can be used to display additional information as well, e.g., call restriction information and other information useful to an operator in servicing an operator assisted call.

The telephone network switch 20, to which the operator workstation 10 is coupled, may include, e.g., electronics used for routing telephone calls to and from standard telephones such as telephones 30, 31 and for interfacing with and maintaining a billing database.

Frequently, when seeking to place an operator assisted telephone call, a customer will call an operator using, e.g., the telephone 30. The operator assisted telephone call is directed by the telephone network switch 20 to an operator working at the workstation 10. Transmitted from the switch 20 to the workstation 10, at the start of each operator assisted telephone call, is originating switch information, call type information and call restriction information. As will be discussed below, this information along with the databases discussed above, is used in accordance with the present invention to automate various aspects of servicing the operator assisted telephone call and to check for operator errors, e.g., regarding billing information.

Figure 2B:
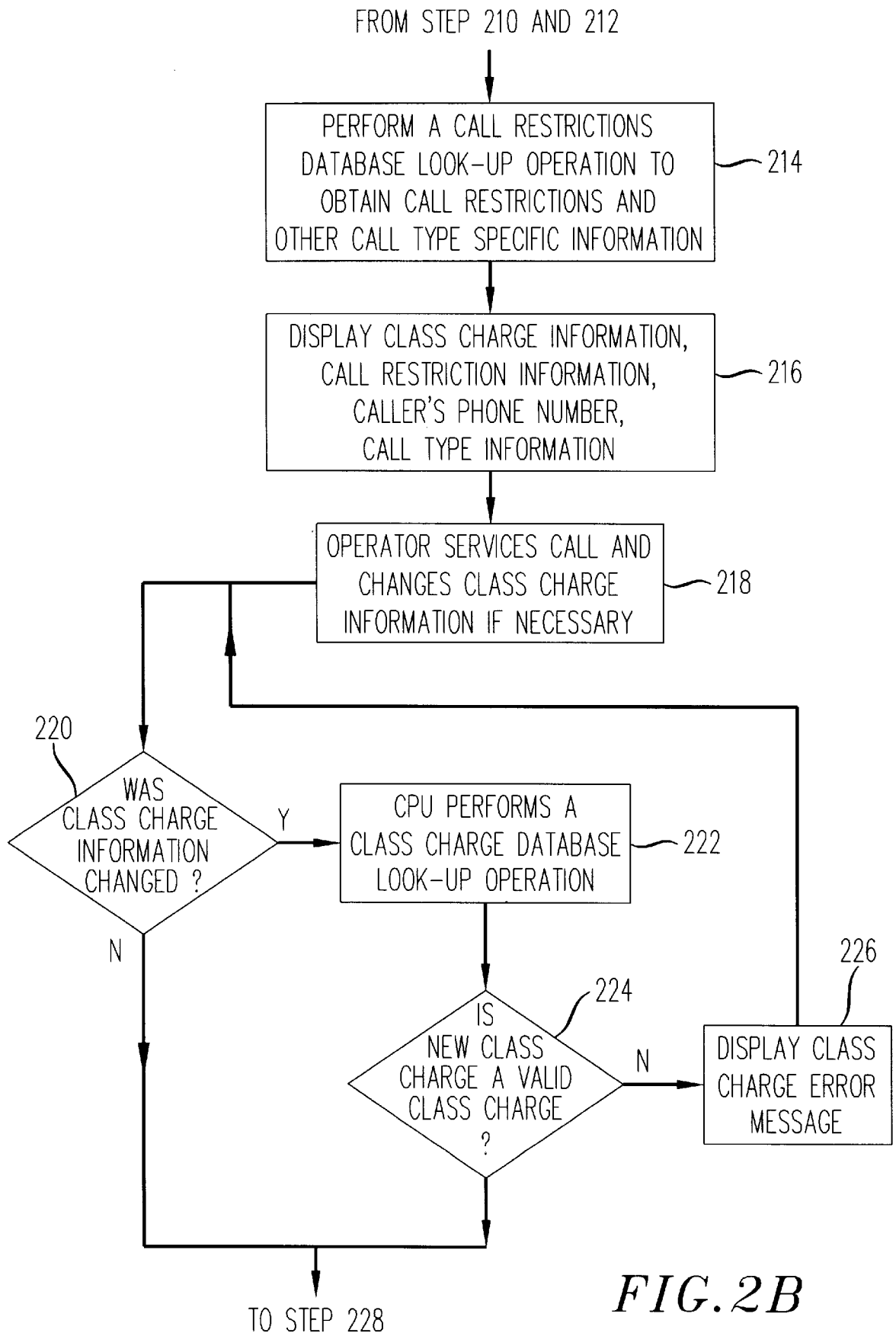
Figure 2C:
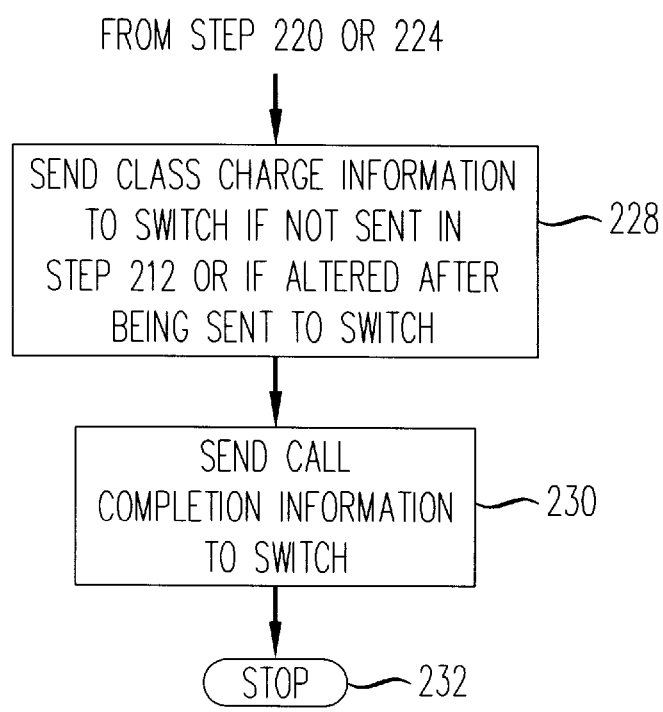

The method of servicing a request for an operator assisted telephone call using the workstation 10, in accordance with one embodiment of the present invention, will now be described with regard to FIGS. 2A, 2B and 2C.

Block 202 represents the start of the procedure associated with servicing an operator assisted telephone call. In the next step, step 204 the workstation receives a request for an operator assisted telephone call from the telephone network switch 20. The request includes switch origination information, call type information and call restriction information. From step 204 operation progress to step 206 where the computer 14, under software control, automatically performs a call type look-up operation using the origination switch information and the call type information to access the call type database 19. From this look-up operation the CPU 17 determines the type of call which the operator is being requested to process.

Once the call type is determined, operation progresses to step 208. In step 208, the CPU 17 performs another look-up operation. This time, the CPU 17 access the class charge database 21 to determine the most frequently used class charge for the particular call type. The most frequently used class charge for a particular call type may be determined by well known analytic methods. If the call is a non-coin call type, then the call will be billed using a station paid call type in the vast majority of cases. Because there is a high chance that the automatically determined default call type will not be altered by the operator when servicing non-coin call types, the class charge information is sent directly to the switch 20 in step 212 for non-coin call type calls to facilitate call processing. Operation then proceeds to step 214. However, if the call is a coin type, then operation progress directly to step 214 of FIG. 2B.

In step 214, the CPU 17, under software control, accesses the call restrictions database using the call restriction information provided by the switch in order to obtain call restriction information and other call specific information that may be useful to an operator when servicing the call. For example, when a call type indicates a call from a prisoner, the call restrictions database may include information instructing an operator not to transfer the call to another destination telephone number.

Operation progresses from step 214, to step 216 where the class charge information, call restriction information, caller's phone number, call type information as well as other information that would be useful to an operator servicing the call is displayed by the computer 14 on the display device 12. After the information required to service a telephone call is displayed, the operator services the call and changes the class charge information if it is necessary to do so to insure proper billing. These actions are performed in step 218.

From step 218, operation progresses to step 220, wherein the computer 14, under software control, determines if the operator changed the default class charge information automatically generated by the computer 14. If the operator altered the default class charge information the method progresses to step 222 wherein the CPU 17 once again accesses the class charge database to verify that a valid class charge has been entered. If the new class charge is a valid class charge, operation progresses directly to step 228. However, if the class charge entered by the operator is not a valid class charge, operation progresses to step 226.

In step 226, the computer 14 displays a class charge error message to the operator thereby prompting the operator to enter new class charge information if necessary. In step 226 the operator may enter new class charge information.

From step 226 the method returns to step 220 where the CPU 17 determines if the-class charge information was changed by the operator. If the operator did not change the class charge information in the previous step, operation progresses from step 226 to step 228. Accordingly, before step 228 occurs the class charge information has already been automatically checked for errors.

In step 228, the class charge information is sent to the switch 20 if the class charge information was not previously sent in step 212 or if it was altered after it was previously sent to the switch 20. From step 228 operation progress to step 230. In step 230 call completion information, e.g., the call destination telephone number, is sent to the switch 20. At this point, the operator assisted call has been serviced and the billing information sent to the switch 20. With this accomplished, the method terminates in step 232 subject to its being restarted upon receipt of another request for the servicing of an operator assisted telephone call.

In the above described manner, the present invention insures that at least the minimum applicable class charge will automatically be entered for each operator assisted telephone call. In addition, the present invention insures that class charges entered by the operator will be automatically checked for errors. Furthermore operators will be informed of specific restrictions and other information applicable to a call being serviced reducing the risk of the operator allowing unauthorized call transactions to be performed.

What is claimed is:

1. A method of servicing an operator assisted telephone call comprising the steps of:

providing to an operator workstation telephone call related data;

displaying a call type associated with the telephone call;

performing a default class charge database lookup operation to determine a default class charge from a plurality of possible class charges, the default class charge corresponding to a most frequently used class charge applicable to the telephone call;

displaying the default class charge;

providing an operator the opportunity to replace the default class charge with a new class charge; and outputting the default class charge to a telephone service billing device if the operator does not change the default class charge.

2. The method of claim 1, wherein the step of performing a class charge database lookup operation involves the step of:

using a first call type identifier to access a class charge database to determine the most frequently used class charge for a call of a type corresponding to the first call type identifier.

3. The method of claim 2, wherein the telephone billing device is a telephone switch, and wherein the method further comprises the step of:

sending the default class charge to the switch before providing the operator the opportunity to alter the class charge information if the first call type identifier indicates that the call is a non-coin type call.

4. The method of claim 2, wherein the telephone call related data includes an originating switch identifier and a call type identifier, the method further comprising the step of:

using the originating switch identifier and call type identifier to perform a call type database lookup operation to obtain the first call type.

5. The method of claim 2, further comprising the step of:

determining whether the operator altered the default class charge; and upon determining that the default class charge was altered to a new class charge, making a determination as to whether the new class charge is a valid class charge.

6. The method of claim 2, further comprising the steps of:

performing a call restrictions database lookup operation; and displaying the results of the call restrictions database lookup operation.

7. The method of claim 6, further comprising the step of:

determining whether the operator altered the default class charge; and upon determining that the default class charge was altered to a new class charge, making a determination as to whether the new class charge is a valid class charge.

8. The method of claim 7, further comprising the step of:

displaying an error message if the new class charge is not a valid class charge; and providing the operator another opportunity to alter the default class charge.

9. The method of claim 1, wherein the telephone call related data includes originating switch identifier information, the method further comprising the step of:

using the originating switch identifier information to perform a call type database lookup operation to obtain the first call type.

10. The method of claim 4, further comprising the step of:

determining whether the operator altered the class charge; and upon determining that the default class charge was altered to a new class charge, making a determination as to whether the new class charge is a valid class charge.

11. An apparatus for assisting in the servicing of operator assisted telephone calls comprising:

a workstation for receiving, processing and displaying telephone call related data, the workstation including:

a data storage device including a class charge information database;

a display device for displaying a class charge and a call type;

means for dynamically selecting a default class charge, from a plurality of possible class charges, by performing a class charge information database lookup operation to determine the most common class charge applicable to an operator assisted telephone call of the particular type being serviced by the operator at any given time and for providing an operator the opportunity to change the default class charge; and a communications link for outputting the class charge information to a telephone service billing device.

12. The apparatus of claim 11, further comprising:

means for allowing the operator to modify the class charge information after it has been output to the telephone service billing device.

13. A method of servicing an operator assisted telephone call comprising the steps of:

providing to an operator workstation telephone call related data;

determining a default class charge;

displaying a call type;

displaying the default class charge and outputting the default class charge to a telephone billing device which is physically distinct from the operator workstation prior to providing the operator the opportunity to replace the default class charge; and providing an operator the opportunity to replace the default class charge with a new class charge subsequent to the default class charge being supplied to the telephone billing device.

14. The method of claim 13, wherein the telephone billing device is a telephone switch.

* * * * *